United States Patent
Richeson

(10) Patent No.: US 7,504,920 B2
(45) Date of Patent: Mar. 17, 2009

(54) MAGNETIC BRAKE ASSEMBLY

(75) Inventor: William E. Richeson, Fort Wayne, IN (US)

(73) Assignee: Tekonsha Engineering Company, Tekonsha, MI (US)

( * ) Notice: Subject to any disclaimer, the term of this patent is extended or adjusted under 35 U.S.C. 154(b) by 1455 days.

(21) Appl. No.: 09/964,086

(22) Filed: Sep. 26, 2001

(65) Prior Publication Data

US 2003/0094337 A1  May 22, 2003

(51) Int. Cl.
*H01F 7/20* (2006.01)
*B60L 7/00* (2006.01)

(52) U.S. Cl. ............................. 335/281; 188/161

(58) Field of Classification Search ................ 335/303, 335/281; 181/161–164
See application file for complete search history.

(56) References Cited

U.S. PATENT DOCUMENTS

| | | |
|---|---|---|
| 3,244,259 A | 4/1966 | Brede, III et al. |
| 3,665,231 A | 5/1972 | Wendler |
| 3,753,182 A * | 8/1973 | Grove .................... 335/281 |
| 3,756,355 A | 9/1973 | Kreider |
| 4,004,262 A * | 1/1977 | Grove .................... 335/281 |
| 4,014,412 A | 3/1977 | Swanson et al. |
| 4,216,849 A * | 8/1980 | Neill .................... 188/138 |
| 4,344,056 A | 8/1982 | Kroeger et al. |
| 4,386,684 A | 6/1983 | Prokop |
| 4,558,077 A | 12/1985 | Gray |
| 4,601,753 A | 7/1986 | Soileau et al. |
| 4,601,765 A * | 7/1986 | Soileau et al. ........... 148/104 |
| 4,718,523 A | 1/1988 | Schneider et al. |
| 4,820,338 A | 4/1989 | Ochiai et al. |
| 4,832,891 A | 5/1989 | Kass |
| 4,873,504 A | 10/1989 | Blume, Jr. et al. |
| 4,975,213 A | 12/1990 | Sakai et al. |
| 5,062,981 A | 11/1991 | Nomura et al. |
| 5,137,783 A | 8/1992 | Tanihara et al. |
| 5,167,915 A | 12/1992 | Yamashita et al. |
| 5,186,286 A | 2/1993 | Lindberg |
| 5,189,324 A * | 2/1993 | Beck et al. .................... 310/51 |
| 5,198,137 A | 3/1993 | Rutz et al. |
| 5,203,438 A * | 4/1993 | Ide .......................... 192/107 C |
| 5,211,896 A | 5/1993 | Ward et al. |
| 5,225,459 A | 7/1993 | Oliver et al. |
| 5,240,627 A | 8/1993 | Mohri et al. |
| 5,268,140 A | 12/1993 | Rutz et al. |
| 5,271,891 A | 12/1993 | Gay et al. |
| 5,279,785 A | 1/1994 | Mohri et al. |
| 5,300,156 A | 4/1994 | Mohri et al. |
| 5,303,802 A | 4/1994 | Kuwahara |
| 5,306,524 A | 4/1994 | Rutz et al. |
| 5,337,862 A | 8/1994 | Kuwahara |
| 5,393,445 A | 2/1995 | Furuya et al. |
| 5,435,929 A | 7/1995 | Tada et al. |
| 5,472,539 A | 12/1995 | Saia et al. |

(Continued)

*Primary Examiner*—Elvin G Enad
*Assistant Examiner*—Bernard Rojas
(74) *Attorney, Agent, or Firm*—Price Heneveld Cooper Dewitt & Litton LLP

(57) ABSTRACT

A powdered metal electromagnetic is provided that has much less variance between units, increased frictional drag, reduced wear of itself and the brake drum disk during use and an increased resistance to moisture due to the use of a donor material that increases performance and reliability. In addition it can withstand much higher surface speeds while producing higher frictional drag.

22 Claims, 5 Drawing Sheets

U.S. PATENT DOCUMENTS

| | | | |
|---|---|---|---|
| 5,499,705 A * | 3/1996 | Ide | 192/107 T |
| 5,501,728 A | 3/1996 | Shepley et al. | |
| 5,543,174 A | 8/1996 | Rutz | |
| 5,563,001 A | 10/1996 | Gay | |
| 5,582,275 A * | 12/1996 | Arnold | 188/138 |
| 5,591,373 A | 1/1997 | Ward et al. | |
| 5,595,609 A | 1/1997 | Gay | |
| 5,767,426 A | 6/1998 | Oliver et al. | |
| 5,791,442 A | 8/1998 | Arnold | |
| 5,792,284 A | 8/1998 | Cedell et al. | |
| 5,829,845 A * | 11/1998 | Maron et al. | 303/20 |
| 5,842,547 A | 12/1998 | Carlson et al. | |
| 5,932,134 A | 8/1999 | Christ et al. | |
| 6,098,760 A * | 8/2000 | Seils | 188/1.11 E |
| 2002/0179384 A1 * | 12/2002 | Velayutha | 188/250 R |

\* cited by examiner

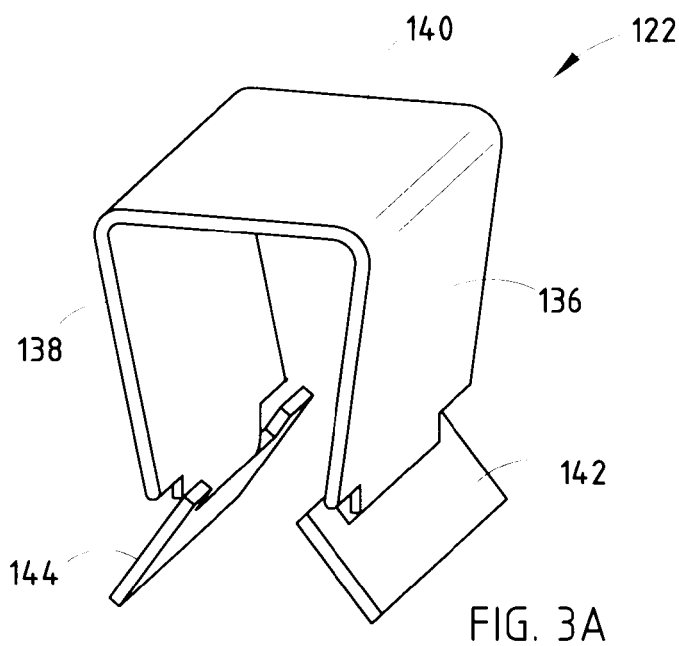
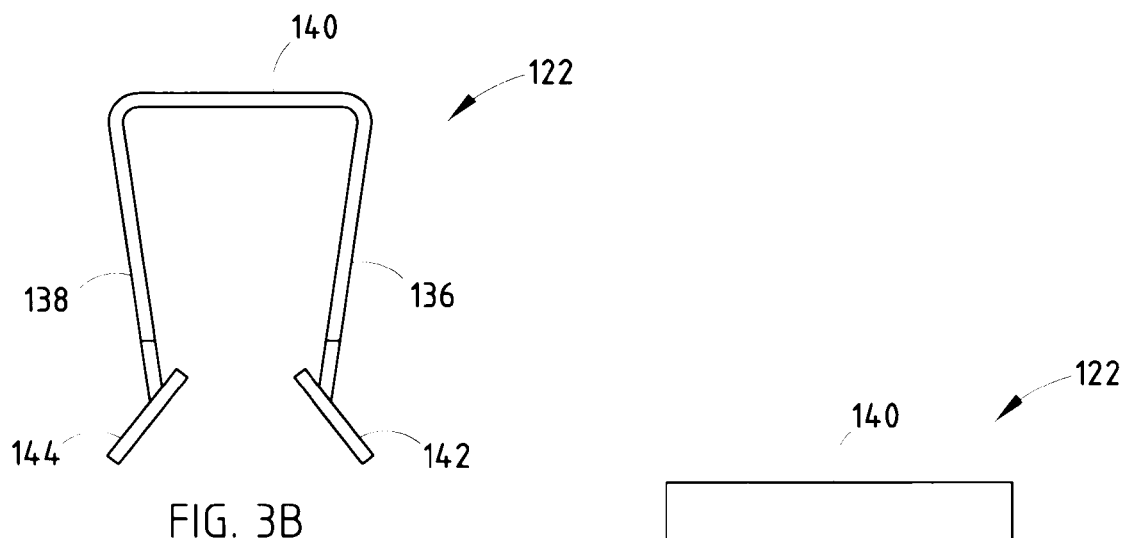
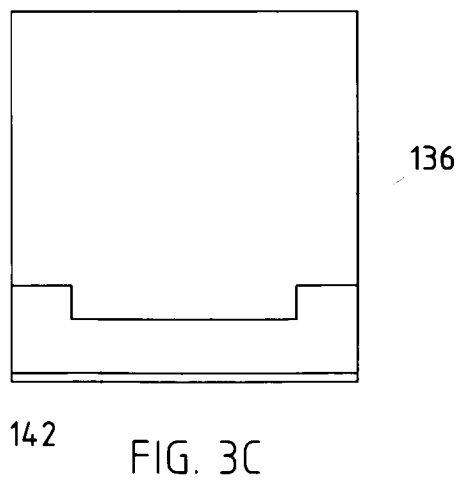

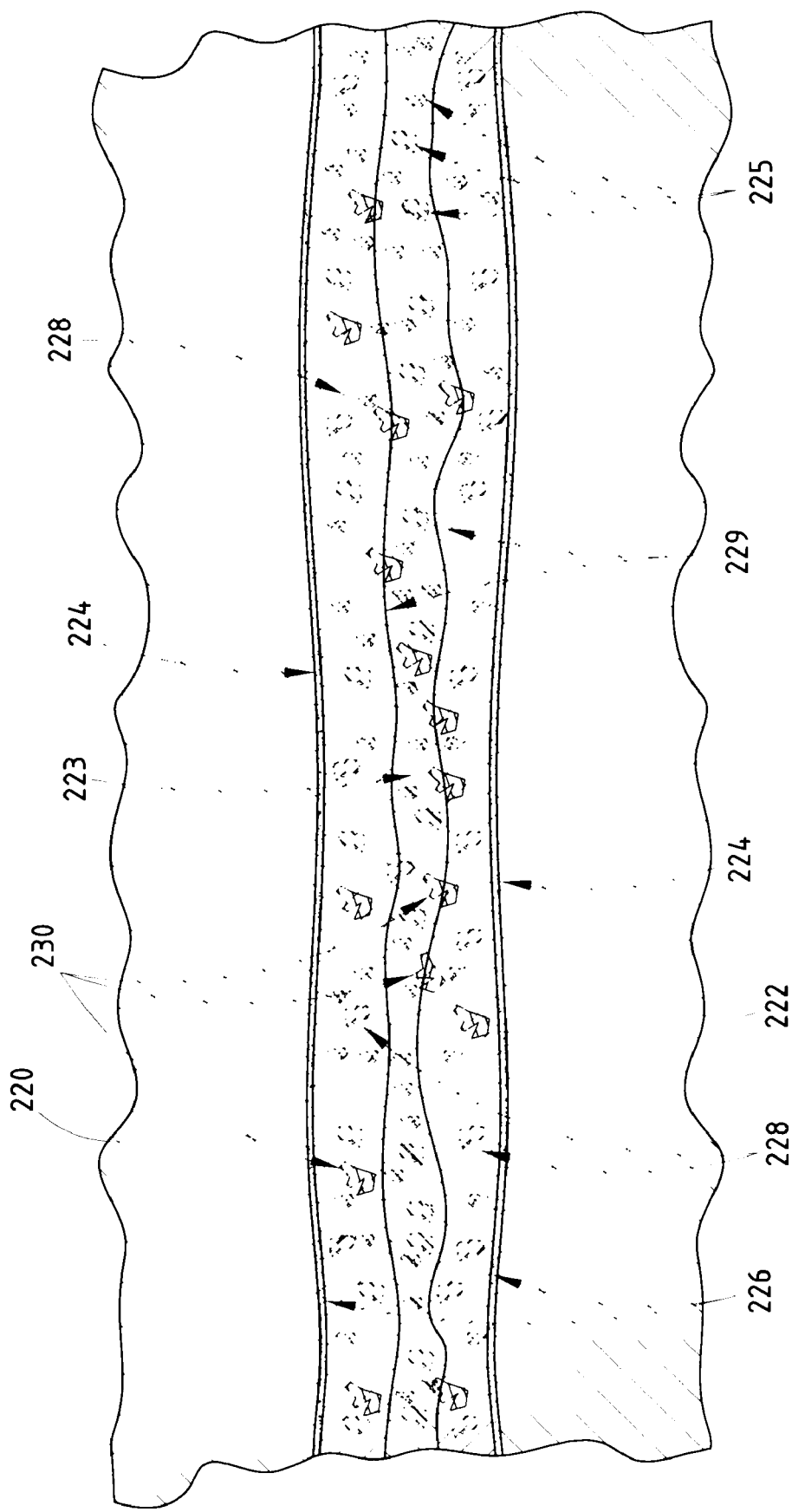

MAGNETIC BRAKE ASSEMBLY

BACKGROUND OF THE INVENTION

This invention relates to an electrically actuated vehicle brake that utilizes electromagnets (EMs) to actuate vehicle brake shoes and more particularly to an improved electromagnet construction for such a brake. Such systems must be reliable and have a long life with a response that has low variability of any kind. The EM is attached to one end of a lever that is attached to a backing plate. There is a light spring force between the lever and the EM, thus putting the EM in contact with the face of the brake drum. The EM, when energized, forcibly drags against the face of a rotating brake drum and effects pivotal movement of the lever to actuate the brake shoes. The EM is mounted for limited movement relative to the lever so as to ride flat on the face of the brake drum disk during braking. When an electric current is passed through the coil, the side of the EM housing that faces the face of the brake drum disk is drawn against the rotating brake drum. The lever to which the EM is attached in turn expands the brake shoes into frictional engagement with the brake drum.

The amount of resultant braking is a function of the amount of electrical current supplied to the EM and the coefficient of friction between the EM and the brake drum disk. As the current increases, the magnetic force of the EM against the brake drum disk creates an increasing frictional drag. The brake shoe actuating arm moves arcuately (within its movement limits) against the arm springs. When the electrical current is decreased, the braking force is lessened. The brake shoe retraction springs operate to retract the brake shoes from engagement with the brake drum and also to return the brake shoe actuating arm to the brake release position. Since electric brakes rely on an electromagnet to convert the electrical energy supplied by a controller to mechanical energy, safety and reliability of the vehicle brakes depend on the low variability and the high repeatability, effectiveness, and reliability of the electromagnet.

EMs for actuating vehicle brakes have included cast, stamped, and sintered powder metal (PM) EM housings. In general, the EM housings have been cup-shaped and have provided an annular opening to receive a coil winding. Typically, after the coil is positioned within the annular opening, the housing opening is closed with a molding material and it is this visage that develops attractive and frictional drag.

Most of the currently available magnets in the industry use an epoxy-like material or an injection molding compound to encapsulate the magnet coil in the iron core of the EM and are filled flush to the active frictional face. This material comes in contact with the surface of the brake drum disk. As the material heats, it tends to change its form and can deposit residue on the brake drum. This residue, which is sometimes slippery, cohesive and/or adhesive, tends to cause the brakes to slip, then grab, then slip, and then grab. Some of the material used can also create very low friction and wear (such as in the case of nylon-like material) and can prevent the EM from readily wearing if it stands proud (i.e. prevents the metal from touching). Due to the oftentimes high thermal expansion coefficient and/or high tendency to expand with moisture, this can be a problem as desired frictional drag is uncertain and often greatly reduced. The delayed functional contact of the EM core with the opposing moving metal surface is highly undesirable and dangerous. In both cases the plastic material that is used does not keep the metal-to-metal surfaces from galling and/or does not exhibit the desired frictional drag characteristics.

Another approach that has been employed is discussed in U.S. Pat. No. 3,668,445 to Grove. Grove uses a frictional insert that is supposed to have a lower wear rate than the PM and is supposed to supply the frictional drag of the unit by way of it standing proud. Grove's explanation is that the primary frictional drag comes not from the metal-to-metal interface but from the insert and the brake drum disk. However, Grove's insert material can carry little force due to its low modulus of elasticity. Thus, approximately 99% of the frictional drag comes from the metal-to-metal contact.

Grove U.S. Pat. No. 3,760,909 discloses grooves for the purpose or removing surface dust. With the attractive force of the EM in the 200-lb. range and considering the surface speeds, as well as the area of the brake drum disk as compared to the area of the EM, this is not viewed as a primary problem.

Pressed sintered PM housings have been widely used for electromagnets due to the low cost of manufacturing relative to other methods. Another prime advantage is that very low-carbon high-purity annealed iron can be used that has highly desirable magnetic properties such as having high magnetic saturation capabilities. The disadvantage of the current powdered metal EMs is that they degrade from moisture infiltration. Environmental moisture infiltration can readily occur in powdered metal electromagnets even as they are stored. Moisture infiltration of the powdered metal causes internal corrosion of the powdered metal causing it to have a lower level of magnetic saturation. This reduced magnetic saturation level reduces the drag force that the electromagnet can apply to a drum brake. Degradation of the powdered metal electromagnets due to moisture infiltration has been observed to cause high variability by reducing the drag force of commercially available EMs. As the powder metal corrodes, maximum magnetic saturation level is reduced. The impact can be as high as 65% reduction in the effectiveness of an EM prior to or after being installed in an electric brake. Use of copper infusion, and other like approaches, decreases the allowed magnetic saturation an impractical amount. Use of nonporous coatings cannot exist on the wearing metal-to-metal contact that is required at the EM to drum disk interface. Therefore, moisture can still enter the EM on that surface. Commercially available powdered metal electromagnets that have not yet degraded on the storage shelf can readily degrade in the field upon exposure to moisture. Typically, such EMs in use have had high variability from unit to unit in operating the brake mechanism.

The current commercially available EMs suffer from premature local magnetic saturation effects within their magnetic circuits that limit the magnetic field that can be produced. This effect is due to variable magnetic cross section in the core structures. The result is that they use more excitation current, larger copper, and more turns to get the magnetic force that is required. The cost of producing such units and the total current for operating a braking system is great. The required power to operate a system using these devices is very high. The wiring installed system excitation wiring resistance for such a system has to be lower due to the higher required operating currents, thus increasing the cost of installation by requiring heavier copper wiring. If smaller copper is used, then the sensitivity of various parts the installation becomes a greater concern in maintaining equal braking responses for the various wheels because of the variations in the excitation circuit for the various axles.

Some units that are marketed will burn out due to high energy dissipation when on the work bench. When in contact with the brake drum disk, the unit experiences a large protective heat sink; however, when in the process of braking a vehicle, the frictional drag of the EM can produce heat on the order of a thousand watts. Thus the magnetic core heat sink of the coil is at a high temperature that can be on the order of 375 degrees Fahrenheit. The coils and potting of commercial units do not prevent this problem.

SUMMARY OF THE INVENTION

One aspect of the present invention is an improved electromagnet for use in a brake, the electromagnet comprises a powder metal housing and core, a bobbin, a copper coil, and a friction material. The donor material comprises a powder metal housing and core, a bobbin, a copper coil, and a friction material comprising a polymeric donor material, where the donor material comprises 18% to 35% of a polymer from the group consisting of polyphenylene sulfide, epoxy and phenolic, 5% to 30% Kyanite, 4% to 18% graphite, 9% to 45% of a sulfide or sulfate compound, and 8% to 30% glass fibers, by the total weight of the donor material.

These and other features, advantages and objects of the present invention will be further understood and appreciated by those skilled in the art by reference to the following specification, claims, and appended drawings.

BRIEF DESCRIPTION OF THE DRAWINGS

FIG. 3A is a perspective view of the retaining clip portion of the drum brake assembly of FIG. 1;

FIG. 3B is an elevational view of the retaining clip portion of the drum brake assembly of FIG. 1;

FIG. 3C is a side elevational view of the retaining clip portion of the drum brake assembly of FIG. 1;

FIG. 6 is a plan view of the surface layers of the electromagnet of the present invention.

DETAILED DESCRIPTION OF THE PREFERRED EMBODIMENT

On a vehicle it is essential that all of the wheels have essentially the same braking. Uncertain and unequal electromagnet (EM) response must be avoided to as large an extent as possible to prevent some wheels from having overly aggressive braking response which can lead to lockup that can cause a dangerous loss of control of the vehicle.

Figure 1:
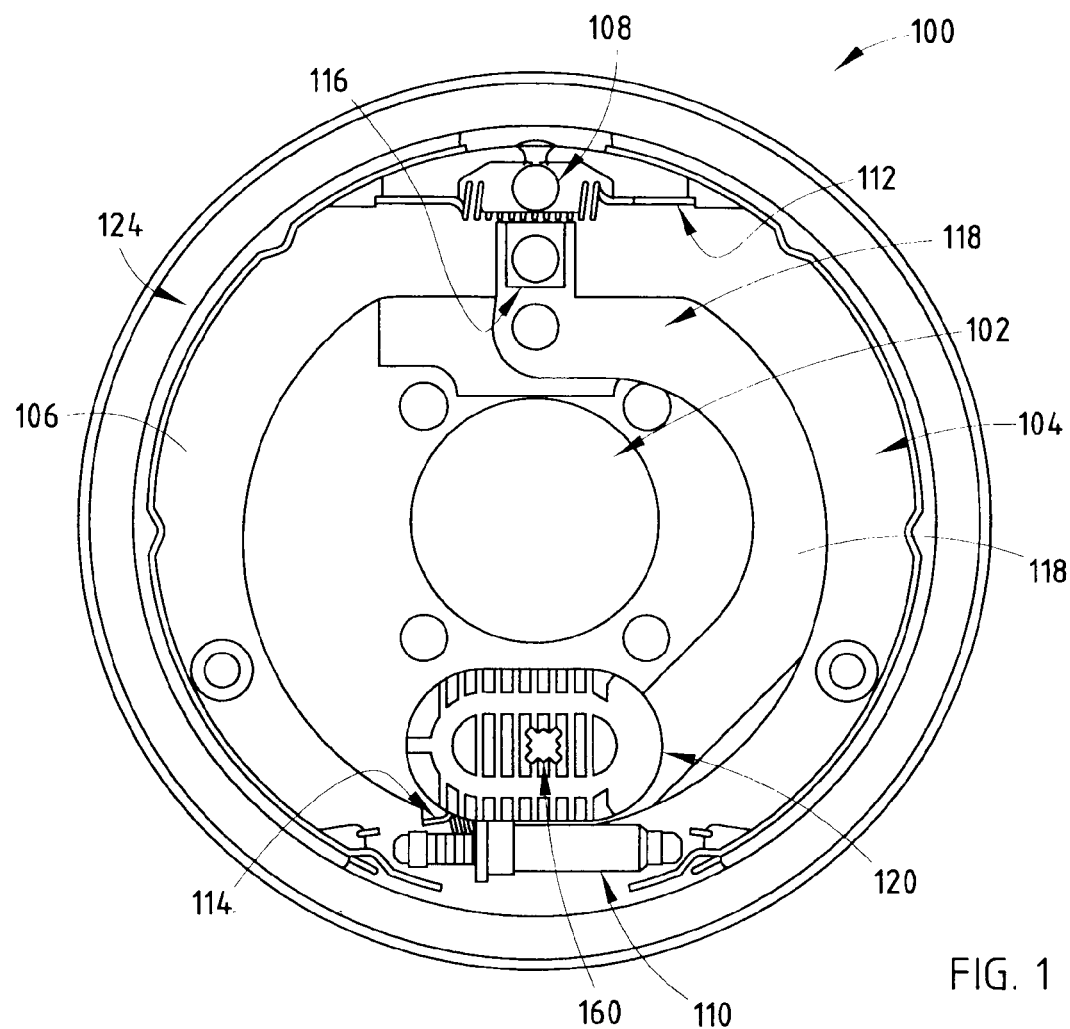
FIG. 1 is an elevational view of a drum brake assembly employing the present invention.

FIG. 1 illustrates an electric drum brake 100 according to the present invention. Drum brake 100 includes a backing plate 102, which supports a pair of brake shoes 104 and 106. The upper portions of brake shoes 104 and 106 engage a post 108. The lower portion of brake shoes 104 and 106 are positioned by an adjusting link 110. Tension springs 112 and 114 maintain the relative position of shoes 104 and 106 to post 108, to adjusting line 110, and to each other. A pivot pin 116 attached to backing plate 102 supports an actuating lever 118. The lower end of actuating lever 118 includes a slot (described below), which serves as a means to allow attachment of an electromagnet 120 to actuating lever 118. Electromagnet 120 is attached to actuating lever 118 by a retaining clip 122 (described below).

Drum brake 100 operates as follows. Briefly described, when the brakes of a towing vehicle are applied, an electric current is sent to the electromagnet 120 of electric drum brake 100. The electric current energizes electromagnet 120. The energized electromagnet 120 is attracted to a brake drum 124. As electromagnet 120 attempts to rotate with brake drum 124, actuating lever 118 moves which causes brake shoes 104 and 106 to move radially, thus causing contact and friction between the brake drum and brake shoe.

Figure 2A:
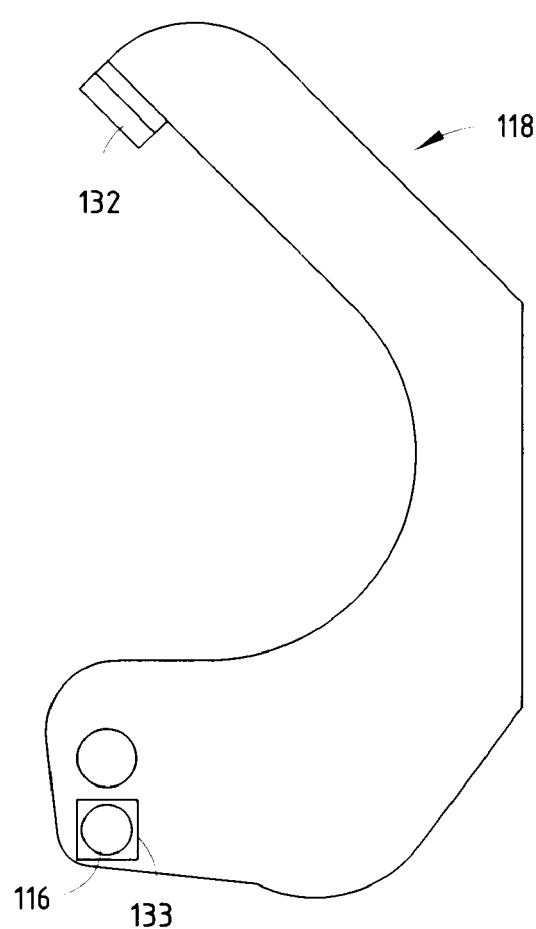
FIG. 2A is a front elevational view of the actuating lever portion of the brake of Fig.
Figure 2B:
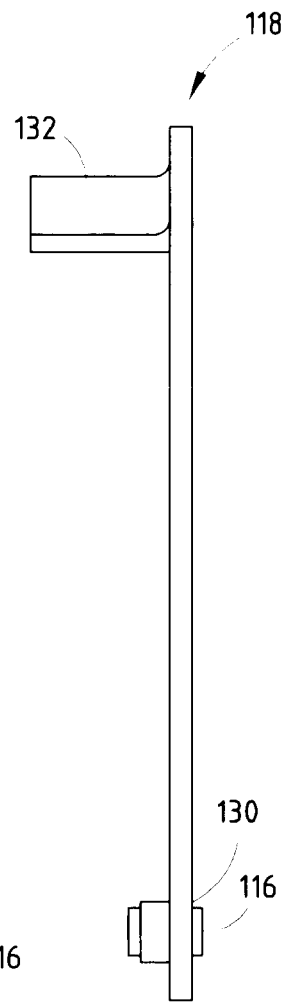
FIG. 2B is a side elevational view of the actuating lever of FIG. 2A.
Figure 2C:
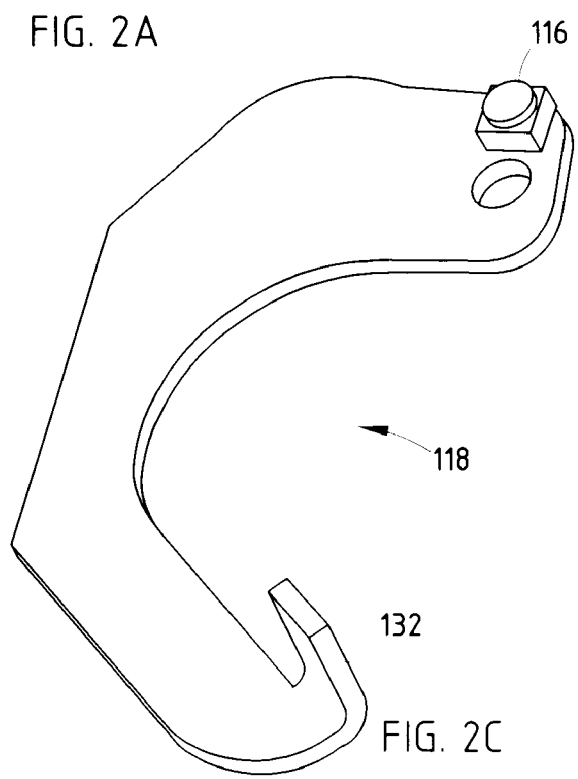
FIG. 2C is a perspective view of the actuating lever of FIG. 2A.

FIGS. 2A, 2B, and 2C further illustrate actuating lever 118. Actuating lever 118 is arcuately shaped and has an assembly 133 that accepts pivot pin 116. Actuating lever 118 also includes a leg 132 at the opposite end from a hole 130. Leg 132 is sized and shaped to attach to electromagnet 120.

FIGS. 3A-3C show the retaining clip 122 in detail. Retaining clip 122 has a first biasing arm 136, a second biasing arm 138, a base 140, and bottom portions 142 and 144, which depend from biasing arms 136 and 138, respectively. Biasing arms 136 and 138 are recessent so that retaining clip 122 will snugly hold electromagnet 120 on actuating lever 118.

Figure 4:
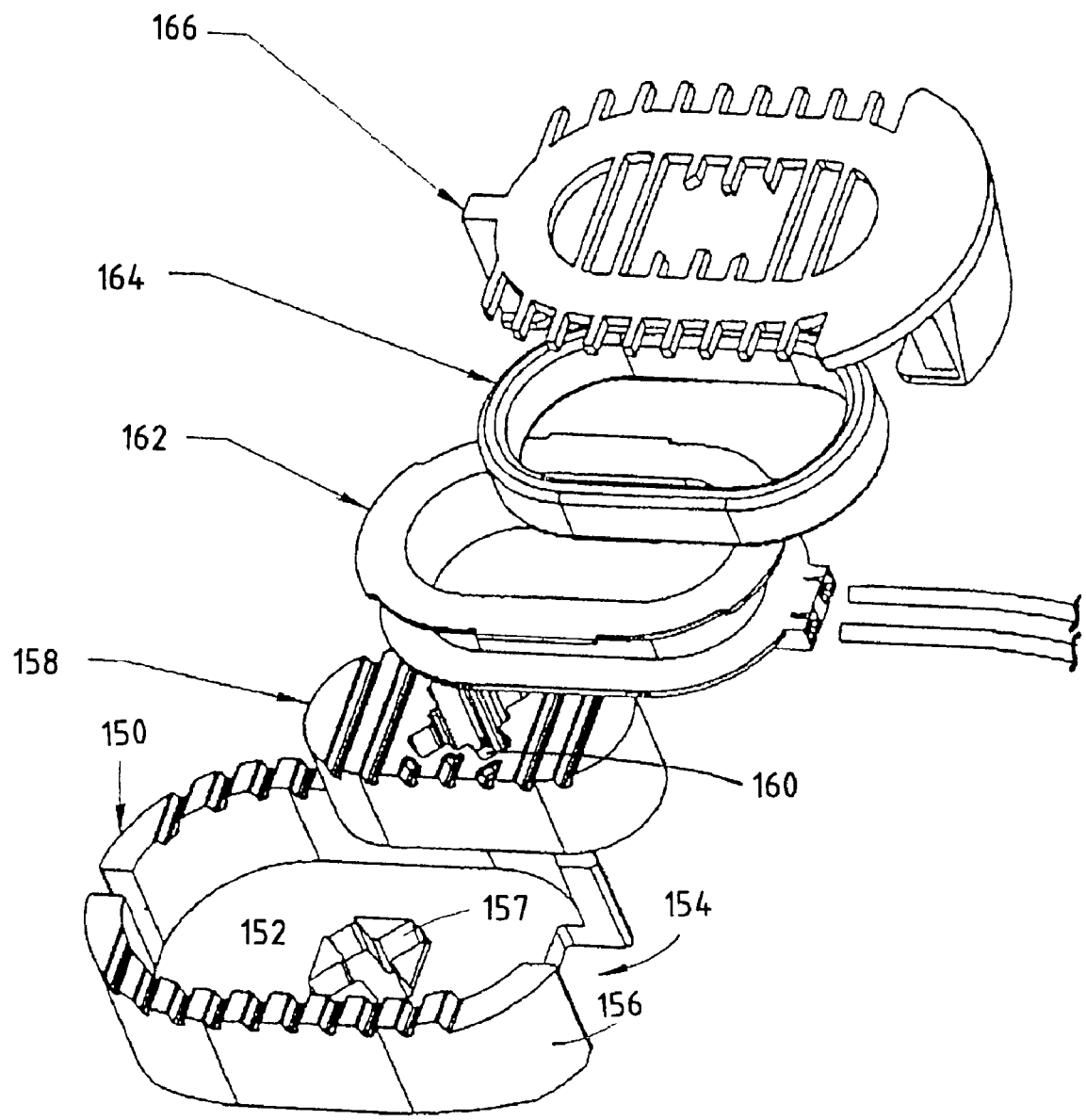
FIG. 4 is an exploded perspective view of the electromagnet assembly of the present invention.

FIG. 4 illustrates the components of the electromagnet 120. Included is a housing 150. Housing 150 includes a channel 152 and a notch 154 in its exterior wall 156. Housing 150 also has a bore 157 sized and shaped to receive retaining clip 122. An inner core 158 sits inside housing 150. Inner core 158 has a bore 160 through it, matching up with bore 157, and is also sized and shaped to receive retaining clip 122. Housing 150 and inner core 158 are preferably made of powder metal. Electromagnet 120 also includes a bobbin 162 preferably made of glass-filled nylon, and a coil 164 which is preferably formed of 26-gauge wire having 187 turns. A friction wear material 166 fills the grooves and spaces in the electromagnet 120. Friction material 166 is described in detail below.

The rim of the electromagnet of the present invention is preferably between about 0.127 inches and about 0.400 inches, and most preferably about 0.220 inches in thickness. At 0.220 inches, the EM can handle 100 mph conditions of emergency braking. The rim thickness should be formed proportionally to the core width. In other words, as the rim size increases, the core width should increase by the same proportion to balance the propensity of the EM to avoid early limiting magnetic saturation which can cause an enhanced non-linear response.

PM electromagnets have certain characteristics that make them desirable for automotive brake assemblies and from a magnetic standpoint. They are typically of fully annealed very low carbon (on the order of 0.01%) iron which has a high saturation capability. It is possible to substitute very low cast or rolled fully annealed iron for powdered metal EMs. However, from a wear standpoint, powder metal EMs are superior to such material. It has been found that premature aging of powder metal electromagnets can be eliminated by impregnating the powder metal with a polymeric sealing material. The polymer serves to prevent internal corrosion caused by moisture absorption. As previously stated, moisture infiltration results in corrosion, which reduces the maximum magnetic saturation level capability of the material. Impregnation of the powdered material with the polymer also positively affects the friction and wear characteristics of the EM. The wear between the PM EM surface and the drum brake surface is rather complex due to the free graphite, iron oxides, and grain complexity of a cast iron drum. A typical PM EM is essentially a pure iron structure made up of broadly shaped particles scattered throughout its very porous structure. The pores of the PM EM of the present invention, though impregnated with a sealant, have a propensity to be loaded with the stiffer donor wear products on the exposed contact surface which is highly desirable.

Impregnating the powdered metal with a polymer aids in the machining of the powdered material because the polymer stabilizes the structure by supporting the particles in shear and reducing the frangible nature of the powdered metal. Thus, impregnation of the powdered metal tends to decrease friability and hence reduces the wear rate of the PM EM.

Due to the huge surface area of the compressed powder metal particles, it is difficult to protect the powder metal, but impregnation of the EM core assembly is a viable protection of the powder metal to prevent deterioration of the magnetic saturation due to inner magnetic particle oxidation. This is preferable over 100% compaction, which is very costly. Impregnation of the sintered powder metal part allows the performance of the magnet to be a consistent from unit to unit as well as over time.

Competitor units do not have designs that keep the magnetic cross section throughout the PM Core of the EM. This makes the designs have an inherently poor magnetic performance. Premature saturation takes place in certain areas of the core that limits the desired overall strength and linearity of the magnetic attractive force of the EM. Because of this problem, a constant cross of the EM to within plus or minus three percent is preferable for the present invention.

The subject cross sections are: the central core, the area below the outside margin of the perimeter of the central core through the thickness of the back body of the cup core, the inside perimeter of the bottom of the rim of the central core through the thickness of the back of the cup core, and the cross section of the body of the rim. The magnetic cross section of the surface of the central core and the surface of the rim is also controlled and held to the highest possible degree in consideration of the need for thermal, magnetic, and donor material supply recovery and redistribution for the frictional drag requirements.

The approach of the present invention yields a balanced design with better utilization of the material that results in an EM with greater magnetic strength for a given amount of iron and copper. One example is the rim thickness which is increased to prevent saturation of the rim as well as other places that takes place in various commercial electromagnets. This magnetic saturation takes place prior to saturation in other parts of current EMs and is a weak link in current designs. A separate consideration is excessive heating in the rim areas of commercial designs which is due to insufficient cross section, and hence high frictional stress levels and lower thermal conduction. The effect is that there is a greater concentration of thermal energy at this region of the EM. In addition there is a higher thermal gradient due to the small thermal conduction path which increases the temperature thus enhancing the tendency of galling the EM and scoring the brake drum disk. This reduces the service life of both the EM and the brake drum disk. The metal contact areas in the face of the rim of the housing and the face of the inner core have thus been increased in concert with the constant magnetic cross section of the EM. An additional thermal path for the rim is through the higher thermal conductivity of the donor material versus that of the plastic molding compounds used in commercially available EMs.

It was also found that the lack of mechanical rigidity in the commercial electromagnets caused them to flex and yield so that their mating face flatness to the brake drum disk varied, thus resulting in a changing air gap, causing a change in the attraction force, thereby changing the EM drag force. The current invention corrects this rigidity deficiency by changing the cross sectional area of the core parts which leaves less room for the coil and incorporates more metal in the structural rigidity of the core design. This is in concert with the magnetic constant cross section principal and the use of higher density PM material that has higher yield strength and a higher modulus of elasticity. The yield strength of the PM material is preferably between about 18.5 ksi (kilo psi) and about 50 ksi, and more preferably above 20 ksi. Another preferable method is the selection of a high strength potting material with a high modulus of elasticity, which contributes to the rigidity and strength of the EM.

A stiff, high thermal conductivity injection molding compound has been invented that also serves as a lossy lubricant that protects the surface of the EM and the brake drum disk from wear yet causes a high coefficient of friction to exist between them. The compound also produces a very thin coating on the ferrous parts that protects by way of increasing the PVF (pressure×velocity×friction coefficient=energy dissipated) capability of the metal contacting surfaces, as well as increasing the friction between them by way of a renewable coating, thus preventing galling and reducing wear. This compound thus serves as a lossy donor lubricant that creates a high coefficient of friction when used with surfaces of PM iron, cast iron or steel, while creating a wear resistant surface on the metal-to-metal contact surfaces. This donor material is used as molding compound that is in the contacting face of the EM, distributed in the annular space between the EM pole pieces, and within the grooves of the metal surfaces of the EM. The grooves thus serve as a source of donor material to accomplish the above purposes prior to and during the engagement of the EM and the brake drum disk surfaces.

In the preferred embodiment, the powdered metal electromagnets are manufactured out of Hoerganaes 1000 series or 0.45 p Anchor cold rolled steel or their equivalent. This iron is generally made up of 200/325 sieve size particles. The powder metal is green pressed at approximately 30 tons per square inch at approximately room temperature, and then sintered at a temperature of approximately 2050° F. to a density of 6.8 g/cc. Alternatively, the powder metal can be green pressed at 285° F. providing a desired higher density and a higher magnetic saturation capability at an increased cost. Impregnation must take place as soon as possible after sintering.

The initial DC resistance of a powder metal electromagnet of the present invention is approximately 3.6 ohms. Initially applying 3 amps requires a range of 9.6-10.5 volts to be delivered to the electromagnet terminals at an electromagnet temperature of approximately 75° C. In this voltage range the dissipation is initially 28.8-31.5 W. The external temperature of the electromagnet increases while in use due to electrical current, mechanical friction, and/or temperature of the drum brake. Increasing the temperature of the electromagnet requires constant drive current or an increasing excitation voltage to maintain the same attractive force. The increase in the coil resistance in turn causes an increase in the power dissipation of the electromagnet when driven by a constant current source.

One method of stabilizing the ampere turns as a function of temperature on a braking system that is voltage controlled is through the use of a series element in each EM that has a negative temperature coefficient of resistance so that when acting in concert with the positive coefficient of the copper wire of the coil, the coil current will remain essentially constant with temperature when excited by a constant voltage. Another method is through the use of a second opposing winding that has a positive temperature coefficient so that the EM has more AT subtracted at low temperature and less subtracted at higher temperature. Thus, in both cases the ampere turns of the EM would be stabilized over temperature. Both methods rely on a brake controller that controls the desired braking by way of establishing a controlling voltage. The system that operates on a controlling voltage principal assures that each wheel of a vehicle receives the same braking. A system that operates on a constant controlling current works well if the current going to each brake EM is the same. Such equal division requires parallel current sources. In each of the above systems an essentially parallel approach is maintained to maximize safety so that loss of one brake does not endanger all.

The thermal effects can be addressed in part by minimizing the thermal dissipation path. This can be accomplished by minimizing the volume that the windings of the coil need occupy, which in turn minimizes the required cavity volume in the cup core and thus the thermal path. Minimizing the required cup cavity volume allows heat to more quickly dissipate from the electromagnet. Molding the coil with a thermally conductive donor material also decreases the thermal path of the EM. Using the donor material throughout the assembly also allows the EM to operate at a lower drive current to achieve the same frictional drag.

Figure 5:
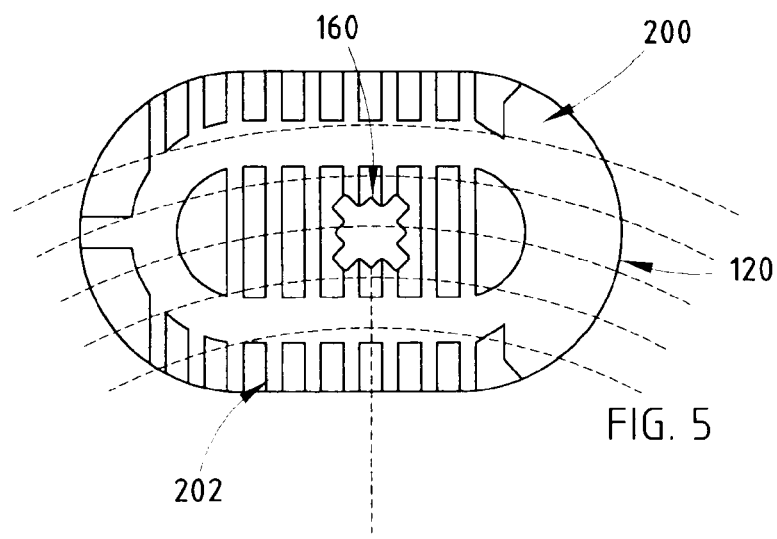
FIG. 5 is a plan view of the electromagnet assembly of the present invention.

FIG. 5 shows the face of the EM 120 with an over-lay of vectors showing motion of the brake drum disk over its face. The frictional drag force between the EM and the ferric brake drum disk face mainly comes from the zone between the metal-to-metal interface. There is a lesser drag force coming from the surface of the non-metal part of the EM and its extended shelf 200. EM 120 also includes grooves 202 that contain donor material therein. There is a small eddy current drag due to the electrical conductivity of the material of the moving parts.

The Young's modulus of elasticity of the PM portion of the EM is preferably between about 13 million psi and 29.5 million psi, more preferably between about 17 million psi and about 21 million psi, and most preferably about 19 million psi, compared to 2.5 million psi for the selected non-metal part. This modulus of the magnetic core changes with the density of the PM. The ratio of the areas of the non-metal part and PM faces is approximately 2 to 1 which equates to approximately 10% of the frictional drag being from the surface of the non-metal part. In one unit the non-metal part insert had a modulus approximately 0.125 million psi and if all was the same, the frictional drag contribution of the insert would be 0.5% that of the EM core face. Assuming 100 lb. total drag, the calculated drag from the non-metal part is 10 lb. (due to the modulus being a factor of 1/10 that of the PM and the area being double that of the metal). This compares to 0.5 lb. out of a total drag of 60 lb. At 60 mph the eddy current drag is 5 lb. due to the resistivity of cast iron of the inside of brake drum.

In the case of sliding surfaces between the EM and the brake drum disk, the goal is to minimize wear and yet have a large coefficient of friction. There exist surface-to-surface characteristics and interactions such as electrical contact conduction, heat transfer, frictional electrostatic effects, adhesion, cohesion, mechanical force effects (such as elastic and non-elastic and plastic deformations), mechanical wear, chemical reactivity, absorbed surface layers, and friction, all of which depend on the materials, the surface velocity, the pressure, and temperature.

There is a large variety of circumstances that exist in the situation of sliding surfaces and hence a large number of theories of lubrication. Commonly, lubrication has a connotation of the reduction of wear and friction. In a broader sense it refers to the control of wear and friction. The frictional phenomenon is in the region of boundary layer lubrication. The measure of success is measured in the value of PVF (in ft.-lb./sec), which is the rate of heat production. The ultimate goal is to control the damaging effects of the energy generation and its mode of dissipation.

The above non-metal is a donor material that supplies the compounds that make it possible to get high friction, high thermal tolerance with high thermal conductivity, and low wear while having a high elastic modulus. FIG. 6 illustrates one example of how the donor material may be applied through frictional shear and adhesion from the donor surface to the disk and from the disk to the EM interface. The surfaces are likewise supplied material from the donor shelf 200 and the grooves 202. At the bottom of FIG. 6 is the cast iron drum 222 and at the top, powder metal 220. FIG. 6 illustrates how it may be to a very large extent controlled, recovered, redistributed, and reused by the multiple transition edges (that have a large dynamic heat mass transfer due to high velocity gradients and hence intense curl at these regions) of the grooves 202 in the face of the EM 120. The transfer rate tends to be greatest at these places and anywhere there is a rather abrupt change in the point-by-point spacing of the moving surfaces. Grooves 202 serve to recover and distribute the donor material to the EM and brake drum disk contact surfaces. This enhances friction as well as increasing the PVF. Also, the grooved surfaces break up the contact areas so as to better conduct away the heat due to frictional drag, thus preventing a continuing buildup of temperature of the surfaces. Once the surface temperature reaches a certain point, the thermal conductivity starts to significantly decrease and the temperature rises significantly. Once this happens, the local frictional drag increases, thus destroying the original smooth condition of the surfaces.

The interface must have a sufficiently large overall bearing interface characteristic PVF product capability (Pressure in lb./sq. in)×(relative Velocity in ft./sec.)×(coefficient of Friction experienced), release of heat (in ft.-lb./sec), and thermal conductivity of the assembly to prevent galling and high wear rates. Experimentally it has been shown that the PVF of other commercially available units for the operating conditions of cast iron against the PM in the intended application was too low. Thus there was high wear and galling. In order to extend the magnitude of the PVF product capability of the interface to satisfy the need for the desired performance, special steps and formulation of materials are required. The magnitude of the PVF product is a measure of the performance that a bearing can withstand. At 60 mph the PVF of the EM is in the order of 1,000 watts which is approximately 300 W/sq. in (the EM electrical dissipation at 3 amp is in the order of 35 watts and, a 500-lb. loaded tire brake would be in the order of 36 KW). This must be tolerated without undo alteration of the frictional drag mechanism that is to be protected.

Certain areas of the EM are made to be a source of the donor material that will supply the materials to create the desired lossy lubricant that will satisfy the required level of PVF. The highest potential PVF is best taken advantage of when the contiguous moving parts are flat and smooth. If they are not flat and smooth, the microscopic and/or macroscopic dissipated heat is uneven and therefore the PVF capacity is not fully utilized. In addition, the thermal conductivity of the thin transfer layers (see FIG. 6) and the nature of the transition layer (free particles) between them and the brake drum disk face all play a roll in the outcome of a moving contact event. The goal is to develop a sufficiently high PVF to cover the basic circumstances as well as its variances so as to support the highest PVF by controlling every link in the chain, the ability to get rid of heat, and to protect the materials. The application is such that the PVF varies with road speed, intensity of desired braking, operating temperature, and the particular surface point on the EM. This latter variable is affected by the geometrical design factors and mounting of the EM on the actuating arm of the brake mechanism.

The arrows in FIG. 5 indicate the motion of the brake drum disk across the surface of the EM. The surface speed varies as the radius of the path changes, and as the radial area changes, the force changes and hence the stress and the drag force also change. The frictional drag force comes chiefly from the region of the transition layers of the interface between the engaging metal surfaces. The result is that the PVF is different across the face of the EM due to position as well as material. The effect is that the distribution of frictional drag and heat varies. The goal has been to have a high enough PVF characteristic to satisfy the need so that the wear will be minimally affected.

The design of the EM and the mounting of the EM on the brake activation arm must be such as to cause little torque of the arm from its rest plane to assure free movement of the activation arm. The coupling should be such that the arm is non-binding and free to convey frictional drag force to the activation arm with as little EM overturning moment as possible. Such a moment can cause tilting of the EM which develops uneven surface pressure on the EM face. This must be countered so that the wear on the face of the EM is even. To balance any residual moment, a counter moment is created by including the leading shelf 200 of donor material (see FIG. 5). The shelf 200 is made of an insert of non-magnetic material (so as not to create additional tilting force due to magnetic attraction) that has a low wear rate against the cast iron disk.

The use of injection molding, use of a thermoset fill, or the use of an insert in the contact face, all of which have special donor characteristics, are used in the assembly of the EM. In all, the binder material has hard particles to clean and hone the surfaces to maximize planar contact area and create friction. Factors for choosing a suitable binder material include its heat deflection temperature, flame retardancy, and a high modulus of elasticity. Suitable binders include polyphenylenesulfide, polyether-ether-ketone, polyether-ketone, polyether-ketone-ether-ketone-ketone, polylmide, polyethernitrile, polyari-ether-ketone, liquid crystal polymer, epoxy, phenolic, and polyester thermoset.

Referencing FIG. 6, these hard particles wear less than the main body of the donor material, stand proud, and function to gage the thickness and distribution of the transfer layer 223. These particles plow the transfer layer 223 and occasionally the pyrite and/or the metals, leaving them clean in small microscopic areas. The plowing also produces high microscopic temperatures when plowing pyrite and metal which can thermochemically reduce a metallic sulfate such as Barite (which includes barium sulfate) or a metallic sulfide such as antimony trisulfide, which is part of the donor. The exposed iron can then be converted into a hard pyrite 224 which is mainly iron sulfide with impurities and is thick at some places and very thin at others. The EM core material is similarly affected except that the metal is relatively soft and malleable pure iron along with a microsurface that can react readily with sulfur and metals. The EM PM surface is full of surface pores and small fissures that can readily retain surface deposits and coatings which offer some special advantages to limit wear yet allow a reasonable coefficient of friction. This takes place through the action of the special donor lubricant.

Hard particle compositions 225, graphite, binder particle compositions, iron, along with iron oxides, pyrites, barium with various compounds, and mixtures of the hard particles such as Kyanite pyrites, or aluminum oxide conglomerate mixtures form the transfer films. In this case the clean surfaces promote adhesive coating 226 of the above mixtures made possible by the donor material on the EM and on the cast iron faces. In addition these hard particles 225 of angular crystal-like particles that are imbedded in the surface films as well as in the transfer powder plow the softer interface coatings on the metal surfaces, thus doing work converting mechanical energy to heat. These surfaces are re-finished by cohesive friction of the coatings. Graphite is included to control the degree of cohesive bonding (at 228 for example) of the moving surface coatings and the adhesive bonding of the metal surfaces. Material such as Barite and other materials in the form of relatively small soft somewhat rounded particles serve to better absorb energy of turbulent particles in the layer between the moving surfaces.

Fiber, such as glass (0.005" to 0.032" long×0.0001" to 0.001" in diameter, preferably 0.005" to 0.015" long×0.0001" to 0.0005 in diameter), is added to the donor mix to increase shear strength of the donor material of the extended overhanging shelf, as well as to increase the effective shear strength of the coatings. Another item of importance is the binding material that has characteristics that maintain the renewable surfaces on the cast iron and PM and can withstand the operating temperatures. This combination also works together to form a thin lossy transition lubricant. The donor material preferably includes 18 to 35% PPS, epoxy, or phenolic, 5 to 30% Kyanite or 0 to 20% aluminum oxide, 4 to 18% graphite, 9 to 45% Barite, and 8 to 30% glass fibers by total weight of the donor material. A preferred example donor material has 24% PPS, 19% Kyanite, 41% Barite, 9.5% glass fibers, and 5.7% graphite by total weight of the donor material.

Due to the fact that the donor material is molded around the EM coil, it was formulated to be an electrical insulator and have a high thermal conductivity. The donor material was also selected to supply a restoration moment. The shelf and the donor material in the slots apply donor material ahead of the surfaces of the metal-to-metal contact of the brake drum disk, thereby supporting the required PVF.

Torque tests were performed on brakes using the current invention and commercially available brakes. The results from these tests are shown in Tables 1-3. The brakes of Table 1 were tested at 20 mph, the brakes of Table 2 at 40 mph, and the brakes of Table 3 at 60 mph. T1, T2, T3, and T4 are brakes using the present invention, and C1, C2, and C3 are different commercially available electric brake assemblies. "T1" means that the test was aborted due to a safety torque limit so the test fixture would not be destroyed. At 20 mph, the brakes with the present invention had as much as a 42% increase in maximum torque, at 40 mph as much as a 106% increase, and at 60 mph as much as an 82% increase for three-amp excitation compared to the "best" commercial units.

TABLE 1

20 Miles Per Hour Brake Curves for 10 × 2 ¼" Electric Brake

|    | 0 | 0.5 | 1    | 1.5 | 2    | 2.5  | 3    | Current in Amps |
|----|---|-----|------|-----|------|------|------|-----------------|
| T2 | 0 | 700 | 800  | 900 | 1050 | 1200 | 1300 | Torque: lb-ft   |
| T3 | 0 | 800 | 1700 | T1  | T1   | T1   | T1   | Torque: lb-ft   |
| T4 | 0 | 500 | 750  | 950 | 1200 | 1400 | 1750 | Torque: lb-ft   |
| T1 | 0 | 200 | 550  | 725 | 900  | 1100 | 1375 | Torque: lb-ft   |
| C1 | 0 | 200 | 700  | 900 | 1000 | 1100 | 1200 | Torque: lb-ft   |
| C2 | 0 | 0   | 225  | 425 | 625  | 775  | 925  | Torque: lb-ft   |
| C3 | 0 | 250 | 600  | 775 | 825  | 1000 | 1125 | Torque: lb-ft   |

TABLE 2

40 Miles Per Hour Brake Curves for 10 × 2 ¼" Electric Brake

|    | 0 | 0.5 | 1 | 1.5 | 2 | 2.5 | 3 | Current in Amps |
|----|---|-----|---|-----|---|-----|---|----|
| T2 | 0 | 400 | 600 | 800 | 900 | 1010 | 1100 | Torque: lb-ft |
| T3 | 0 | 400 | 1000 | 1200 | 1400 | 1700 | T1 | Torque: lb-ft |
| T4 | 0 | 400 | 750 | 1000 | 1200 | 1350 | T1 | Torque: lb-ft |
| T1 | 0 | 250 | 600 | 800 | 1000 | 1200 | T1 | Torque: lb-ft |
| C1 | 0 | 100 | 400 | 550 | 650 | 700 | 775 | Torque: lb-ft |
| C2 | 0 | 0 | 175 | 350 | 450 | 500 | 600 | Torque: lb-ft |
| C3 | 0 | 200 | 475 | 600 | 675 | 750 | 825 | Torque: lb-ft |

TABLE 3

60 Miles Per Hour Brake Curves for 10 × 2 ¼" Electric Brake

|    | 0 | 0.5 | 1 | 1.5 | 2 | 2.5 | 3 | Current in Amps |
|----|---|-----|---|-----|---|-----|---|----|
| T2 | 0 | 300 | 400 | 600 | 700 | 750 | 800 | Torque: lb-ft |
| T3 | 0 | 300 | 500 | 575 | 825 | 910 | 1000 | Torque: lb-ft |
| T4 | 0 | 300 | 425 | 625 | 750 | 825 | 900 | Torque: lb-ft |
| T1 | 0 | 200 | 425 | 625 | 750 | 825 | 900 | Torque: lb-ft |
| C1 | 0 | 100 | 300 | 325 | 400 | 450 | 500 | Torque: lb-ft |
| C2 | 0 | 0 | 150 | 175 | 200 | 250 | 300 | Torque: lb-ft |
| C3 | 0 | 125 | 300 | 350 | 425 | 425 | 550 | Torque: lb-ft |

These results demonstrate the benefits of brakes made with electromagnets of the present invention. The brakes of the present invention allow the user to create a higher brake torque with less current, therefore creating less heat in the magnet. Also, the larger cross-section of the outer rim allows the PVF to be distributed over a large area which can better conduct away the heat. The heat is also conducted away by the high thermal conductivity of the donor material. These characteristics act in concert to prevent the powder metal from over heating and to prevent galling of the magnet that takes place in the commercial units currently available.

Wear tests were also performed on two brakes using formulations of the present invention and a commercially available brake assembly. The tests were run at a constant temperature of 200° F. operating at 419 RPM at a constant pressure of against the moving surface of 25 psi. The tests were run for 200 cycles of 20 seconds on, and 10 seconds off. The results of these tests are shown in Table 4. Formula 1 is the commercially available brake friction material, Formula 2 is the result using the present invention, and Formula 3 is the result using the preferred donor material composition of the present invention.

TABLE 4

| Material | Coefficient of Friction | Wear (in inches) |
|---|---|---|
| Formula 1 | 0.323 | 0.108 |
| Formula 2 | 0.502 | 0.007 |
| Formula 3 | 0.556 | 0.0075 |

Formulas 2 and 3 resulted in much higher coefficients of friction and much lower wear as compared to the commercially available brake friction material.

The above description is considered that of the preferred embodiment only. Modification of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

What is claimed is:

1. An electromagnet for use in a brake, comprising:
   a polymer impregnated powder metal core containing a coil, and an injection molding material attached to said powder metal core, said powder metal having a Young's modulus of elasticity between about 6.8 million psi and about 29.5 million psi, said injection molding material comprising a donor material having an elasticity greater than about 2 million psi that provides a hard protective wear resistant surface layer, a composite adhering coating layer, and an interim layer that has the ability to act in concert with shearing of said composite adhering coating.

2. The electromagnet of claim 1, wherein said donor material comprises polyphenylene sulfide.

3. An electromagnet for use in a brake, comprising:
   a polymer impregnated powder metal core containing a coil, and an injection molding material attached to said powder metal core, said powder metal having a Young's modulus of elasticity between about 6.8 million psi and about 29.5 million psi, said injection molding material comprising a donor material having an elasticity greater than about 2 million psi that provides a hard protective wear resistant surface layer, a composite adhering coating layer, and an interim layer that has the ability to act in concert with shearing of said composite adhering coating;
   wherein said donor material comprises polyethylesulfide;
   wherein further said injection molding material is comprised of 18-35% polyethylesulfide, 5-30% Kyanite, 4-18% Graphite, 9-40% Barite, and 8-30% Glass filler, by total weight of the donor material.

4. The electromagnet of claim 1, wherein said Young's modulus of elasticity of said powder metal is between about 17 million psi and about 21 million psi.

5. The electromagnet of claim 4, wherein said Young's modulus of elasticity of said powder metal is about 19 million psi.

6. The electromagnet of claim 1, wherein said polymer impregnated powder metal core comprises a stamped annealed low carbon iron.

7. The electromagnet of claim 6, wherein said stamped annealed low carbon iron is Hoerganaes Anchor steel 1000 series.

8. The electromagnet of claim 1, wherein said polymer impregnated powder metal core is green pressed at about 30 tons per square inch and sintered at a temperature of about 2050 degrees Fahrenheit.

9. An electromagnet assembly for a brake, comprising:
   a powder metal housing and core, a bobbin, a copper coil, and a friction material comprising a polymeric donor material, where the donor material comprises 18% to 35% of a polymer from the group consisting of polyphenylene sulfide, epoxy and phenolic, 5% to 30% Kyanite, 4% to 18% graphite, 9% to 45% of a sulfide or sulfate compound, and 8% to 30% glass fibers, by the total weight of the donor material.

10. The electromagnet of claim 9, wherein the donor material comprises polyphenylene sulfide.

11. The electromagnet of claim 9, wherein said glass fibers are 0.005" to 0.015" in length and 0.0001" to 0.0005" in diameter.

12. The electromagnet of claim 9, wherein said sulfide or sulfate compound is Barite.

13. The electromagnet of claim 9, wherein said powder metal housing has a Young's modulus of elasticity between about 6.8 million psi and about 29.5 million psi.

14. An electromagnet assembly for a brake, comprising: a powder metal housing and core, a bobbin, a copper coil, and a friction material comprising a polymeric donor material mixed therewith, where the donor material comprises 18% to 35% of a polymer from the group consisting of polyphenylene sulfide, epoxy and phenolic, 0% to 20% aluminum oxide, 4% to 18% graphite, 9% to 45% of a sulfide or sulfate compound, and 8% to 30% glass fibers, by the total weight of the donor material.

15. The electromagnet of claim 14, wherein the donor material comprises polyphenylene sulfide.

16. The electromagnet of claim 14, wherein said glass fibers are 0.005" to 0.015" in length and 0.0001" to 0.001" in diameter.

17. The electromagnet of claim 14, wherein said sulfide compound is Barite.

18. The electromagnet of claim 15, wherein said glass fibers are 0.005" to 0.015" in length and 0.0001" to 0.0005" in diameter.

19. The electromagnet of claim 18, wherein said sulfide compound is Barite.

20. The electromagnet of claim 14, wherein said powder metal housing has a Young's modulus of elasticity between about 6.8 million psi and about 29.5 million psi.

21. The electromagnet of claim 20, wherein said Young's modulus of elasticity of said powder metal is between about 17 million psi and about 21 million psi.

22. The electromagnet of claim 21, wherein said Young's modulus of elasticity of said powder is about 19 million psi.

* * * * *